(12) United States Patent
Nama et al.

(10) Patent No.: US 12,008,908 B2
(45) Date of Patent: Jun. 11, 2024

(54) SYSTEMS AND METHODS FOR PROVIDING RADIO TRANSCRIPTION TEXT IN A LIMITED DISPLAY AREA

(71) Applicant: HONEYWELL INTERNATIONAL INC., Charlotte, NC (US)

(72) Inventors: Naveen Venkatesh Prasad Nama, Bangalore (IN); Vasantha Paulraj, Madurai (IN); Rahul Pradhan, Bangalore (IN); Nitish Sharma, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 346 days.

(21) Appl. No.: 17/647,236

(22) Filed: Jan. 6, 2022

(65) Prior Publication Data

US 2023/0088863 A1 Mar. 23, 2023

(30) Foreign Application Priority Data

Sep. 21, 2021 (IN) .............................. 202111042709

(51) Int. Cl.
*G08G 5/00* (2006.01)
*G06F 3/04842* (2022.01)
*G06F 3/14* (2006.01)

(52) U.S. Cl.
CPC ....... *G08G 5/0021* (2013.01); *G06F 3/04842* (2013.01); *G06F 3/1423* (2013.01)

(58) Field of Classification Search
CPC .. G06V 40/166; G06V 40/171; G06V 40/172; G06V 40/23; G08B 31/00
See application file for complete search history.

(56) References Cited

U.S. PATENT DOCUMENTS

| 8,588,378 | B2 | 11/2013 | Davies et al. |
|---|---|---|---|
| 9,666,178 | B2 | 5/2017 | Loubiere et al. |
| 9,922,569 | B2 | 3/2018 | Bilek et al. |
| 10,275,427 | B2 | 4/2019 | Saptharishi et al. |
| 10,535,351 | B2 | 1/2020 | Gaston et al. |
| 2005/0203675 | A1 | 9/2005 | Griffin, III et al. |
| 2006/0287786 | A1 | 12/2006 | Todd |
| 2008/0027726 | A1 | 1/2008 | Hansen et al. |
| 2012/0075124 | A1 | 3/2012 | Whitlow et al. |
| 2015/0089392 | A1 | 3/2015 | McGuffin et al. |
| 2015/0162001 | A1 | 6/2015 | Kar et al. |

(Continued)

*Primary Examiner* — Nabil H Syed
*Assistant Examiner* — Cal J Eustaquio
(74) *Attorney, Agent, or Firm* — Lorenz & Kopf LLP

(57) ABSTRACT

Disclosed is a flight deck system comprising a controller for displaying message content from an ATC conversation. The controller is configured to: receive extracted message content from a plurality of messages; and generate a ticker tape graphical element having a first panel and a second panel for display as an overlay over a primary display on an aircraft display device. The first panel has a main panel for displaying message content for a most recently received message and one or more subsidiary panels for displaying message content for up to a first predetermined number of the most recently received messages. The second panel has a bookmark main panel for displaying message content for a second predetermined number of the most recently received bookmarked messages and one or more bookmark subsidiary panels for displaying message content for a third predetermined number of the most recently received bookmarked messages.

20 Claims, 6 Drawing Sheets

(56) References Cited

U.S. PATENT DOCUMENTS

2015/0212701 A1 7/2015 Rodney et al.
2016/0364987 A1 12/2016 Shamasundar
2019/0339928 A1 11/2019 Lafon et al.

SYSTEMS AND METHODS FOR PROVIDING RADIO TRANSCRIPTION TEXT IN A LIMITED DISPLAY AREA

CROSS REFERENCE TO RELATED APPLICATION

This application claims priority to India Provisional Patent Application No. 202111042709, filed Sep. 21, 2021, the entire content of which is incorporated by reference herein.

TECHNICAL FIELD

Embodiments of the subject matter described herein relate generally to communicating with a flight crew member in aerial vehicles. More particularly, embodiments of the subject matter relate to presenting selected messages to a flight crew member during flight.

BACKGROUND

A transcription system can transcribe over-the-air voice communications between an air traffic controller (ATC) and a flight crew member such as a pilot. Over-the-air communications may include both ownship communications and traffic communications. The combination of the ownship communications and traffic communications can provide a flight crew member with a complete picture of all flying aircrafts in an airspace. The ownship communication may include commands for tactical changes in flight path, strategical navigation, traffic alerts, etc. The strategic navigation and other commands may require flight crew to note down important information and execute a command at a later time. Having to note down an important command and to remember to execute the important command at a later time can increase a flight crew member's workload.

Hence, it is desirable to provide systems and methods for alerting a flight crew member of important commands at a later time when knowledge of the command is needed. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a flight deck system in an aircraft for displaying message content from an Air Traffic Controller (ATC) conversation on an aircraft display device is provided. The flight deck system includes a controller. The controller is configured to: receive extracted message content from a plurality of messages (e.g., voice and/or CPDLC) originating from one or more entities outside of the aircraft (e.g., ATC and other aircraft); and generate a ticker tape graphical element having a first panel (recording panel) and a second panel (bookmark panel) for display as an overlay over a primary display on the aircraft display device, each of the first panel and the second panel having a first state (compressed state) and a second state (expanded state). The first panel has a main panel for displaying message content for a most recently received message and one or more subsidiary panels for displaying message content for up to a first predetermined number of the most recently received messages. The second panel has a bookmark main panel for displaying message content for up to a second predetermined number of the most recently received bookmarked messages and one or more bookmark subsidiary panels for displaying message content for up to a third predetermined number of the most recently received bookmarked messages. The controller is further configured to signal the aircraft display device to display the ticker tape graphical element as an overlay over a portion of the primary display on the aircraft display device.

In another embodiment, a method for displaying message content from an ATC (Air Traffic Controller) conversation on an aircraft display device is disclosed. The method includes: receiving extracted message content from a plurality of messages (e.g., voice and/or CPDLC) originating from one or more entities outside of the aircraft (e.g., ATC and other aircraft); generating a ticker tape graphical element having a first (recording) panel and a second (bookmark) panel for display as an overlay over a primary display on the aircraft display device, each of the first panel and the second panel having a first (compressed) state and a second (expanded state); signaling the aircraft display device to display the ticker tape graphical element as an overlay over a portion of the primary display on the aircraft display device; displaying message content for a most recently received message in a main panel of the first panel when the first panel is in the first state; displaying message content for up to a first predetermined number of a most recently received plurality of messages in one or more subsidiary panels of the first panel when the first panel is in the second state; displaying message content for up to a second predetermined number of a most recently received plurality of bookmarked messages in a bookmark main panel of the second panel when the second panel is in the first state; and displaying message content for up to a third predetermined number of a most recently received plurality of bookmarked messages in one or more bookmark subsidiary panels when the second panel is in the second state.

In another embodiment, a non-transitory computer readable medium is provided. The non-transitory computer readable medium is encoded with instructions that when executed by a controller for a flight deck system in an aircraft is configurable to cause the controller to perform a method. The method includes: receiving extracted message content from a plurality of messages (e.g., voice and/or CPDLC) originating from one or more entities outside of the aircraft (e.g., ATC and other aircraft); generating a ticker tape graphical element having a first (recording) panel and a second (bookmark) panel for display as an overlay over a primary display on the aircraft display device, each of the first panel and the second panel having a first (compressed) state and a second (expanded state); signaling the aircraft display device to display the ticker tape graphical element as an overlay over a portion of the primary display on the aircraft display device; displaying message content for a most recently received message in a main panel of the first panel when the first panel is in the first state; displaying message content for up to a first predetermined number of a most recently received plurality of messages in one or more subsidiary panels of the first panel when the first panel is in the second state; displaying message content for up to a second predetermined number of a most recently received plurality of bookmarked messages in a bookmark main panel of the second panel when the second panel is in the first state; and displaying message content for up to a third predetermined number of a most recently received plurality of bookmarked messages in one or more bookmark subsidiary panels when the second panel is in the second state.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

A transcription system can transcribe over-the-air voice communications between an air traffic controller (ATC) and a flight crew member such as a pilot. Over-the-air communications may include both ownship communications and traffic communications. Ownship communications may include commands from ATC for an ownship pilot, and may also include traffic alerts. Traffic communication may include commands for traffic pilots. Knowledge of these commands can provide situational awareness to an ownship pilot.

Figure 1:
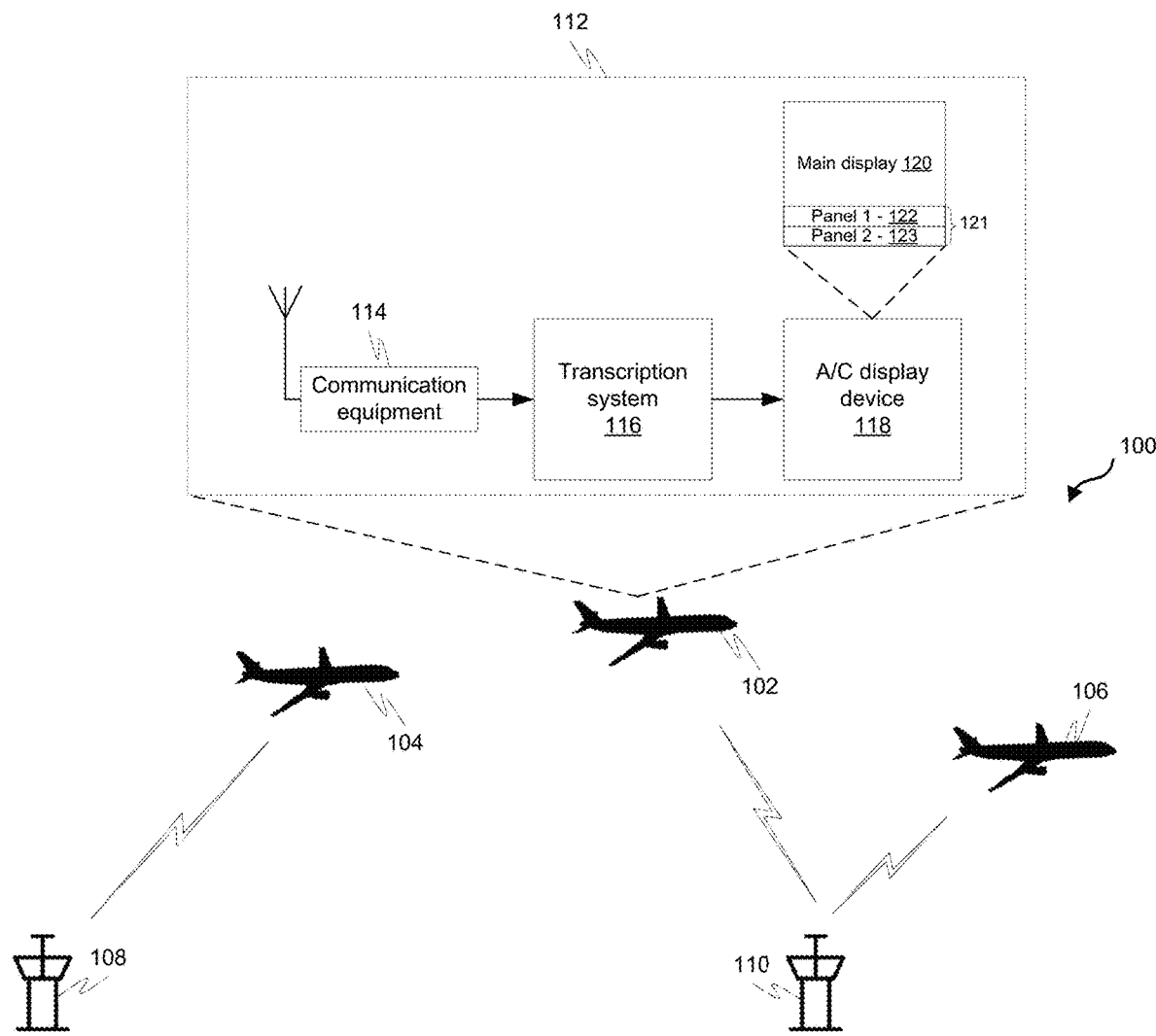
FIG. 1 is a is a block diagram depicting an example flight environment such as one around a busy aerodrome, in accordance with some embodiments.

FIG. 1 is a block diagram depicting an example flight environment 100 such as one around a busy aerodrome. The example environment 100 includes a plurality of aerial vehicles (ownship aircraft 102 and traffic aircraft 104, 106 in this example), but could include a variety of types of aerial vehicles such as helicopters, UAVs (unmanned aerial vehicles), and others. The example environment 100 also includes a plurality of flight operation centers (FOCs) (e.g., air traffic control towers 108, 110) containing control personnel such as air traffic controllers (ATC) for directing ground and air traffic in the vicinity of the aerodrome.

The example ownship aircraft 102 includes avionics equipment 112 that receives the ongoing communications between the aerial vehicles (e.g., 102, 104, 106) and ATC (e.g., via towers 108, 110) using communication equipment 114, and presents the ongoing communications as a continuous stream of audio to a transcription system 116. The transcription system 116 decodes the continuous stream of audio, generates formatted text from the decoded continuous stream of audio, and signals an aircraft (A/C) display device 118 to display the generated formatted text for viewing by the flight crew onboard the ownship aircraft 102. The aircraft display device 118 may be one of many types of graphical display units onboard an aircraft such as a navigation display, a PFD (primary flight display), a PED (personal electronic device), an EFB (electronic flight bag), HUD (heads up display), HDD (heads down display), and others. The display of the formatted text may be made via a generated ticker tape graphical element 121 for displaying transcribed message content from an ATC conversation on the aircraft display device 118 as an overlay over a main display 120 on the aircraft display device 118. The generate ticker tape graphical element 121 includes a first panel 122 for displaying transcribed message content for the most recently received message(s) and a second (bookmark) panel 123 for displaying transcribed message content from bookmarked messages.

Figure 2:
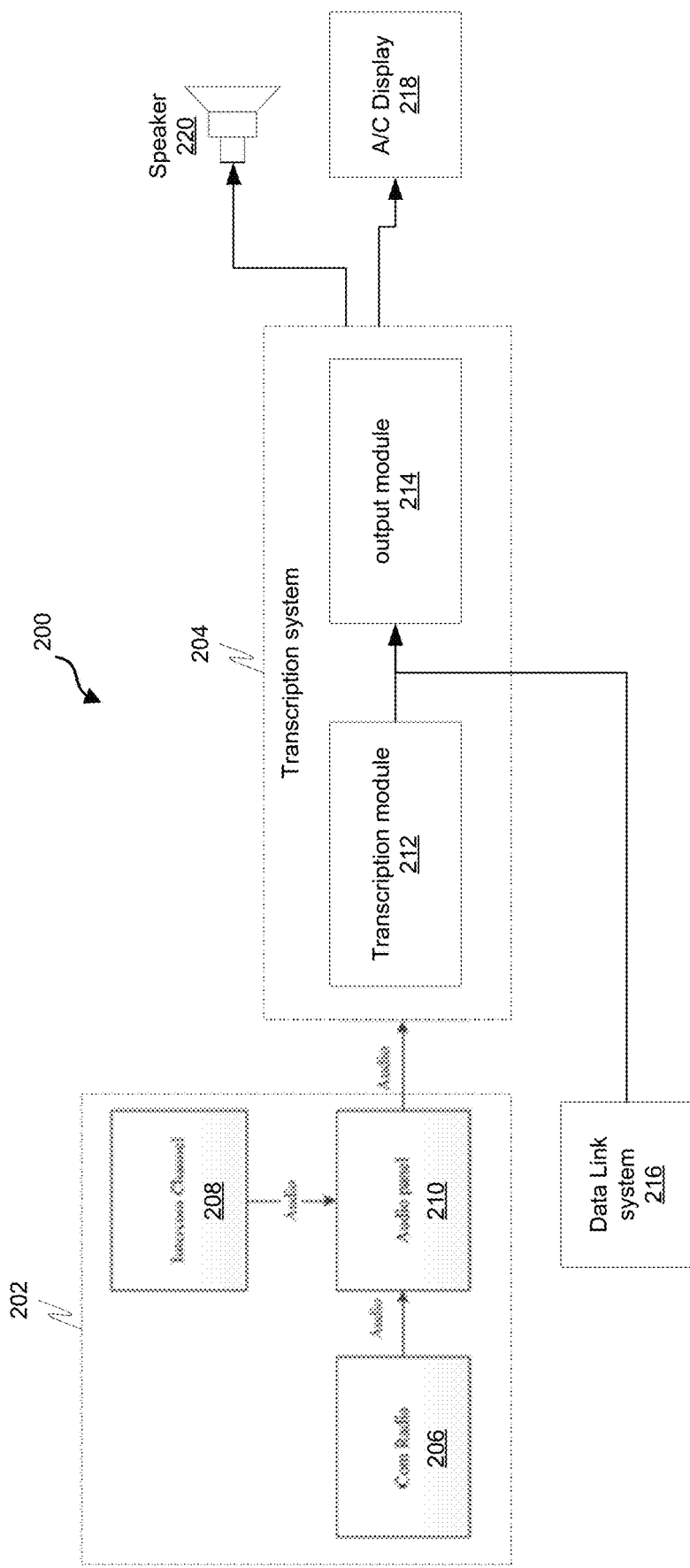
FIG. 2 is a is a block diagram depicting example avionics equipment, in accordance with some embodiments.

FIG. 2 is a block diagram depicting example avionics equipment 200. The example avionics equipment 200 includes communication equipment 202 and an example transcription system 204 for receiving ongoing over-the-air communications and generating formatted text from the over-the-air communications for display onboard an aerial vehicle. The example communication equipment 202 includes a Com radio 206 (such as that known in the art) and an intercom channel 208 (such as that known in the art) for receiving over-the-air communications between various aerial vehicles (ownship and traffic aerial vehicles) and ATC. The example communication equipment 202 also includes an audio panel 210 (such as that known in the art) for accumulating the over-the-air communications from various sources and outputting the audio from the over-the-air communications.

The example transcription system 204 is configured to receive audio communications from or directed to a flight operating center (FOC) (e.g., ATC or some other FOC) via the communication equipment 202 (e.g., via audio panel 210), extract message content from the received audio communications, generate formatted text from the extracted message content, and display the formatted text from the received voice communications onboard the aerial vehicle. The example transcription system 204 is also configured to receive data link communications (DLC) (e.g., CPDLC (controller pilot data link communication)) from or to an FOC (such as ATC) via a data link system 216, extract message content from the DLC, generate formatted text from the extracted message content, and display the formatted text from the received DLC communications onboard the aerial vehicle. The example transcription system 204 includes a transcription module 212 for extracting message content from the received audio communications and the DLC, and an output module 214 for generating formatted text from the extracted message content, generating graphics for displaying the formatted text, and signaling an aircraft display device 218 to display the generated graphics onboard the aerial vehicle.

Each of the transcription module 212 and the output module 214 is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example transcription module 212 is configured to retrieve message content from a plurality of received messages. The plurality of received messages may include a plurality of controller pilot data link communications (CPDLC) messages and a plurality of voice messages. The example transcription module 212 is configured to transcribe message content from the plurality of received voice messages to text. The example transcription module 212 is also configured to extract message content from the plurality of received CPDLC messages as text.

The example transcription module 212 is configured to decode the audio from the voice messages using speech recognition techniques to convert the audio into text. The speech recognition techniques may be implemented using machine learning techniques such as deep neural networks, statistical techniques, rule-based systems, and others. The example transcription module 212 may use various techniques such as NLP to convert the text from the audio and/or DLC to formatted text.

The example output module 214 is configured to generate a ticker tape graphical element for displaying transcribed message content from an ATC conversation on the aircraft display device 218 as an overlay over a primary display on the aircraft display device 218. The generate ticker tape graphical element includes a first panel for displaying transcribed message content for the most recently received message(s) and a second (bookmark) panel for displaying transcribed message content from bookmarked messages. The example output module 214 provides the flight crew with the ability to bookmark messages in lieu of jotting down notes regarding the messages and the ability to display and scroll through the bookmarked messages. The message content for a corresponding received message may include message content from a CPDLC message or transcribed message content from a voice message.

Figure 3:
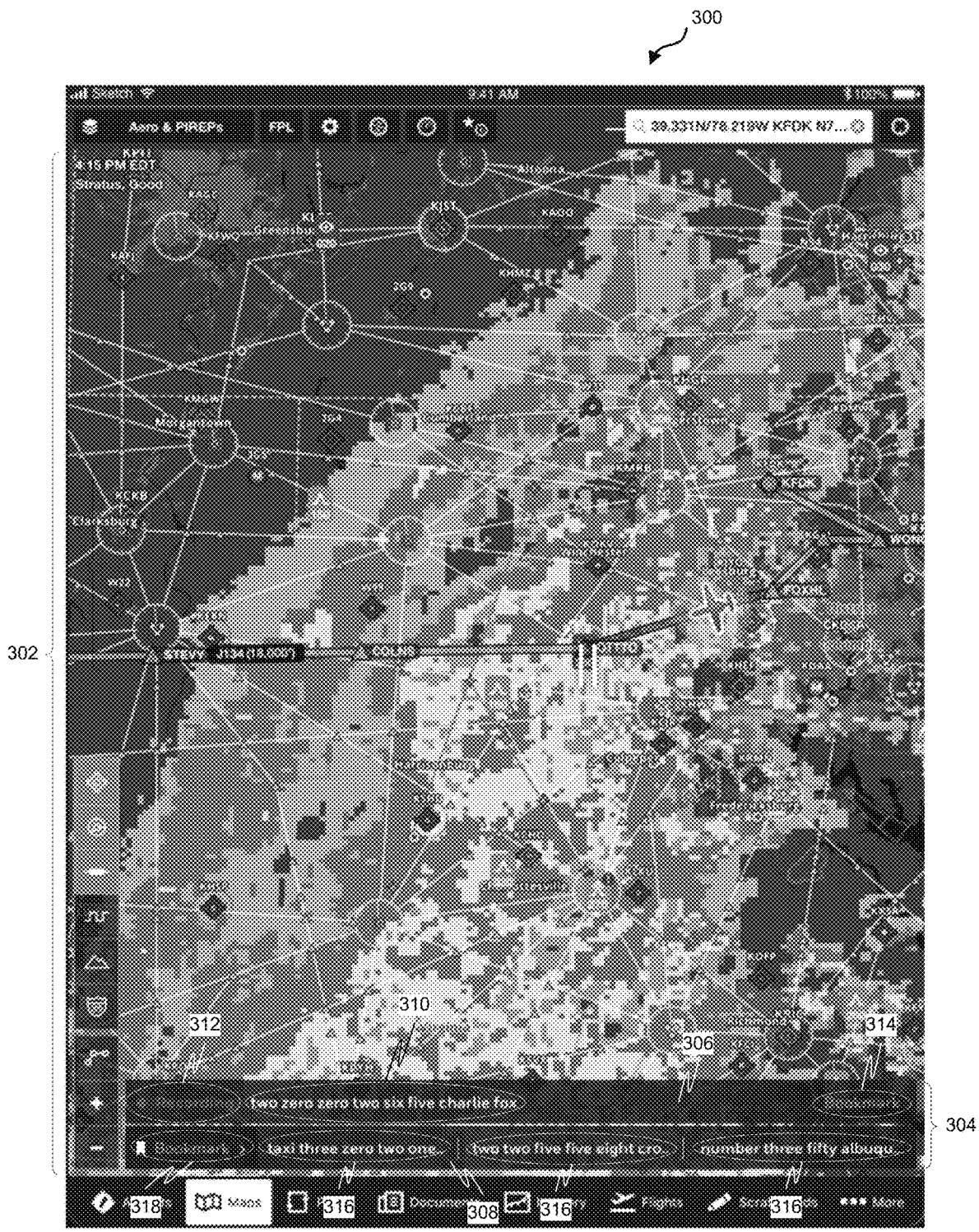
FIG. 3 is a diagram depicting an example aircraft display on an aircraft display device with an example primary display and a ticker tape graphical element for displaying ATC messages as an overlay over the primary display, in accordance with some embodiments.

FIG. 3 is a diagram depicting an example aircraft display 300 on an aircraft display device with an example primary display 302 and a ticker tape graphical element 304 (e.g., generated by a controller that implements the output module 214) for displaying ATC messages as an overlay over the primary display 302. The example ticker tape graphical element 304 includes a recording panel 306 (e.g., first panel) for displaying a most recent ATC message and a bookmark panel 308 (e.g., second panel) for displaying bookmarked ATC messages. The message content displayed in the recording panel 306 is updated when a new transcribed message is available for display. Each of the recording panel 306 and the bookmark panel 308 has a compressed state (e.g., first state) and an expanded state (e.g., second state).

The recording panel 306 has a main panel for displaying message content 310 for a most recently received ATC message and one or more subsidiary panels (not shown) for displaying message content for up to a first predetermined number of the most recently received ATC messages. The example recording panel 306, when in the compressed state, displays, in the main panel, a recording button 312, extracted message content 310 from the most recently received ATC message, and a bookmark selection button 314, but does not display any of the subsidiary panels. Although message content for only one message is shown at a time, a flight crew member may scroll through (e.g., via cursor, swipe, or other touch action) the received messages to view message content for older messages in the main panel. Actuation of the bookmark selection button 314 will result in the associated message being added to a grouping of bookmarked messages.

The bookmark panel 308 panel has a bookmark main panel for displaying message content 316 for up to a second predetermined number (3 in this example) of the most recently received bookmarked ATC messages and one or more bookmark subsidiary panels (not shown) for displaying message content for up to a third predetermined number of the most recently received bookmarked ATC messages. The example bookmark panel 308, when in the compressed state, displays, in the bookmark main panel, a bookmark button 318 and ticker tape summaries of extracted message content 316 for up to the second predetermined number of the most recently received messages that have been bookmarked. The message content displayed in the bookmark main panel is updated when a new bookmarked message is available for display. Although message content for a limited number of bookmarked message is shown at a time via the ticker tape summaries, a flight crew member may scroll through (e.g., via cursor, swipe, or other touch action) the bookmarked messages to view message content for older bookmarked messages in the bookmark main panel.

Figure 4:
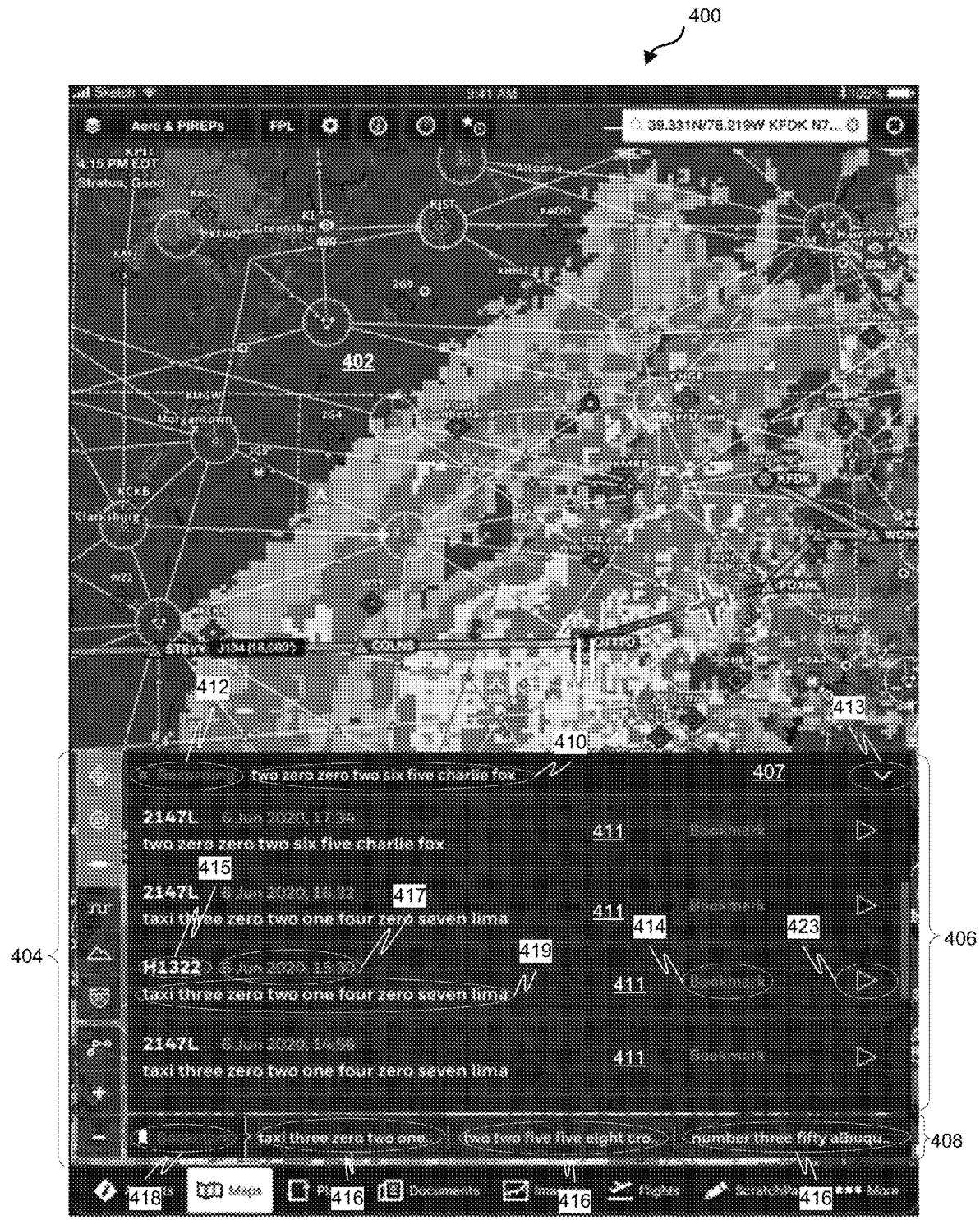
FIG. 4 is a diagram depicting another example aircraft display on an aircraft display device with an example primary display and a ticker tape graphical element for displaying ATC messages as an overlay over the primary display, in accordance with some embodiments.

FIG. 4 is a diagram depicting an example aircraft display 400 on an aircraft display device with an example primary display 402 and a ticker tape graphical element 404 (e.g., generated by a controller that implements the output module 214) for displaying ATC messages as an overlay over the primary display 402. The example ticker tape graphical element 404 includes a recording panel 406 (e.g., first panel) for displaying a most recent ATC message and a bookmark panel 408 (e.g., second panel) for displaying bookmarked ATC messages. Each of the recording panel 406 and the bookmark panel 408 has a compressed state (e.g., first state) and an expanded state (e.g., second state).

The example recording panel 406 has a main panel 407 for displaying message content 410 for a most recently received ATC message and a plurality of subsidiary panels 411 for displaying message content for up to a first predetermined number (4 in this example) of the most recently received ATC messages. The example recording panel 406, is shown in this example in the expanded state. The example recording panel 406 has expanded (e.g., expanded upward) to include the plurality of subsidiary panels 411 adjacent to (e.g., below) the main panel 407.

In this expanded state, the example recording panel 406 displays, in the main panel 407, a recording button 412, extracted message content 410 from the most recently received ATC message, and a pointer icon 413 (e.g., a down arrow widget) that indicates that the plurality of subsidiary panels 411 are being displayed adjacent to (below) the main panel 407 with message content from earlier messages. Each example subsidiary panel 411 is specific to a different message and displays a message recipient identifier 415 (e.g., call sign), date stamp 417, extracted message content 419, bookmark selection button 414, and a message play button 423. Although message content for a limited number of received message is shown at a time via the example subsidiary panels 411, a flight crew member may scroll through (e.g., via cursor, swipe, or other touch action) the received messages to view message content for older messages in the example subsidiary panels 411. Actuation of the bookmark selection button 414 will result in the associated message being marked as a bookmarked message and added to a grouping of bookmarked messages. Actuation of the message play button 423 will result in the associated message being played via a speaker system (e.g., speaker 220) or public address (PA) system in the aircraft.

The bookmark panel 408 panel has a bookmark main panel for displaying message content 416 for up to the second predetermined number (3 in this example) of the most recently received bookmarked ATC messages and one or more bookmark subsidiary panels (not shown) for displaying message content for up to a third predetermined number of the most recently received bookmarked ATC messages. The example bookmark panel 408, when in the compressed state, displays, in the bookmark main panel, a bookmark button 418 and ticker tape summaries of extracted message content 416 for up to the second predetermined number of the most recently received messages that have been bookmarked. Although message content for a limited number of bookmarked message is shown at a time via the ticker tape summaries, a flight crew member may scroll through (e.g., via cursor, swipe, or other touch action) the bookmarked messages to view message content for older bookmarked messages in the bookmark main panel.

Figure 5:
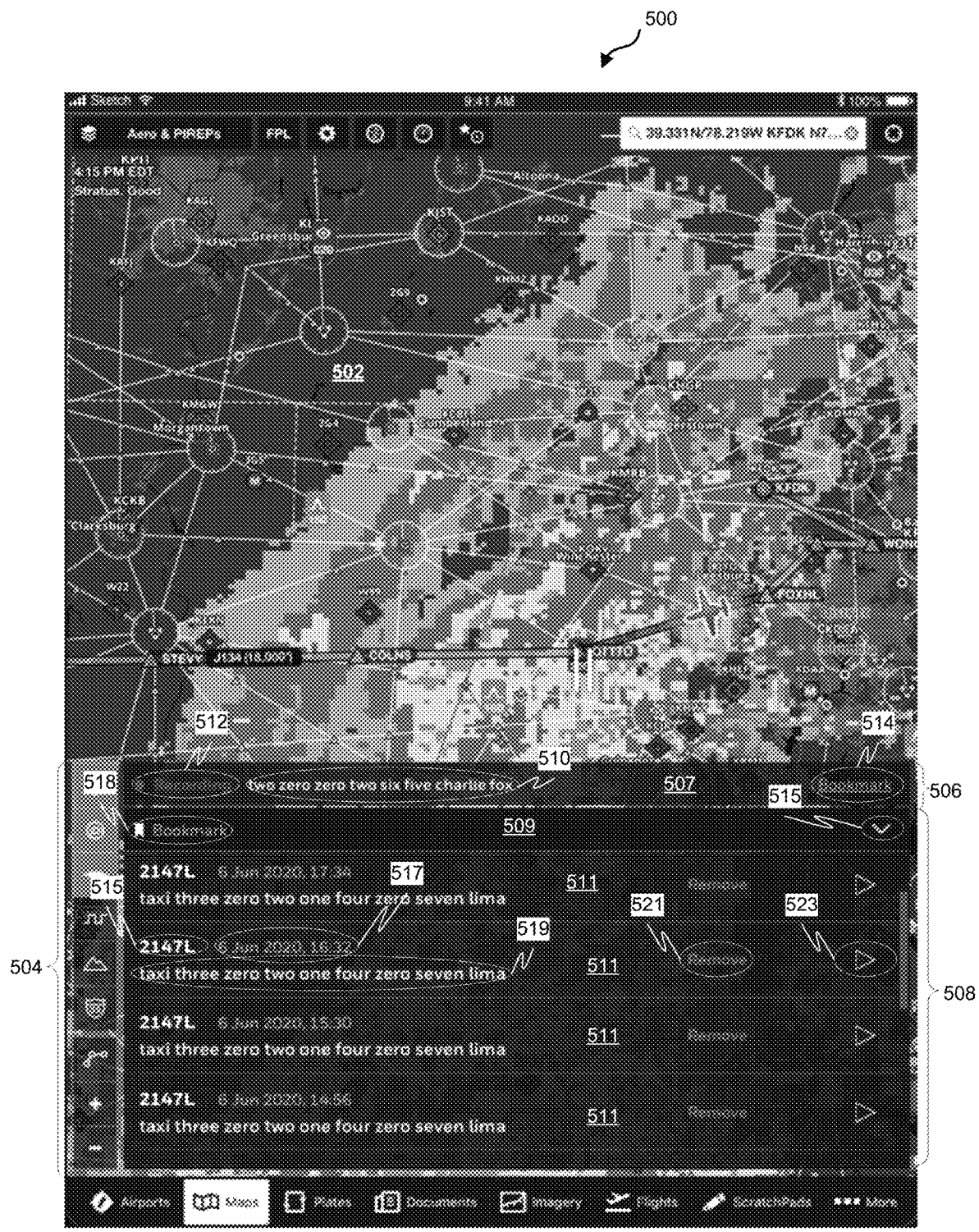
FIG. 5 is a diagram depicting another example aircraft display on an aircraft display device with an example primary display and a ticker tape graphical element for displaying ATC messages as an overlay over the primary display, in accordance with some embodiments.

FIG. 5 is a diagram depicting an example aircraft display 500 on an aircraft display device with an example primary display 502 and a ticker tape graphical element 504 (e.g., generated by a controller that implements the output module 214) for displaying ATC messages as an overlay over the primary display 502. The example ticker tape graphical element 504 includes a recording panel 506 (e.g., first panel) for displaying a most recent ATC message and a bookmark panel 508 (e.g., second panel) for displaying bookmarked ATC messages. Each of the recording panel 506 and the bookmark panel 508 has a compressed state (e.g., first state) and an expanded state (e.g., second state).

The recording panel 506 has a main panel 507 for displaying message content 510 for a most recently received ATC message and one or more subsidiary panels (not shown) for displaying message content for up to a first predetermined number of the most recently received ATC messages. The example recording panel 506, when in the compressed state, displays, in the main panel 507, a recording button 512, extracted message content 510 from the most recently received ATC message, and a bookmark selection button 514, but does not display any of the subsidiary panels. Actuation of the bookmark selection button 514 will result in the associated message being marked as a bookmarked message and added to grouping of bookmarked messages.

The bookmark panel 508 panel has a bookmark main panel 509 and a plurality of subsidiary panels 511 for displaying message content 519 for up to a third predetermined number (4 in this example) of the most recently received bookmarked ATC messages. The example bookmark panel 508, is shown in this example in the expanded state. The example bookmark panel 508 has expanded (e.g., expanded upward) to include the plurality of bookmark subsidiary panels 511 adjacent to (e.g., below) the bookmark main panel 509.

In the expanded state, the example bookmark panel 508 displays, in the main panel, a bookmark button 518 and a pointer icon (e.g., a down arrow widget) 515 that indicates that the plurality of bookmark subsidiary panels 511 are being displayed adjacent to (e.g., below) the bookmark main panel 509. Each example bookmark subsidiary panel 511 is specific to a different message and displays a message recipient identifier 515 (e.g., call sign), date stamp 517, extracted message content 519, bookmark remove button 521, and a message play button 523. Actuation of the bookmark remove button 521 will result in the associated bookmarked message to be removed from the grouping of bookmarked messages. Actuation of the message play button 523 will result in the associated bookmarked message to be played via a speaker system (e.g., speaker 220) in the aircraft. Although message content for a limited number of bookmarked message is shown at a time via the example bookmark subsidiary panels 511, a flight crew member may scroll through (e.g., via cursor, swipe, or other touch action)

the bookmarked messages to view message content for older bookmarked messages in the example bookmark subsidiary panels 511.

Selection via a cursor, touch gestures, or some other method may be used to select the state of the recording panel 306/406/506 or the bookmark panel 308/408/508, or to actuate the recording button 312/412/512, bookmark button 318/418/518, bookmark selection button 314/414/514, bookmark remove button 521, or message play button 423/523.

Selection of the recording button 312/512, when the recording panel 306/506 is in the first state, can result in the display of the recording panel 406 in the second state and the bookmark panel 408 in the first state. Selection of the recording button 412, when the recording panel 406 is in the second state, can result in the display of the recording panel 306 in the first state and the bookmark panel 308 in the first state. Selection of the bookmark button 318/418, when the bookmark panel 308/408 is in the first state, can result in the display of the recording panel 506 in the first state and the bookmark panel 508 in the second state. Selection of the bookmark button 518, when the bookmark panel 508 is in the second state, can result in the display of the recording panel 306 in the first state and bookmark panel 308 in the first state.

Figure 6:
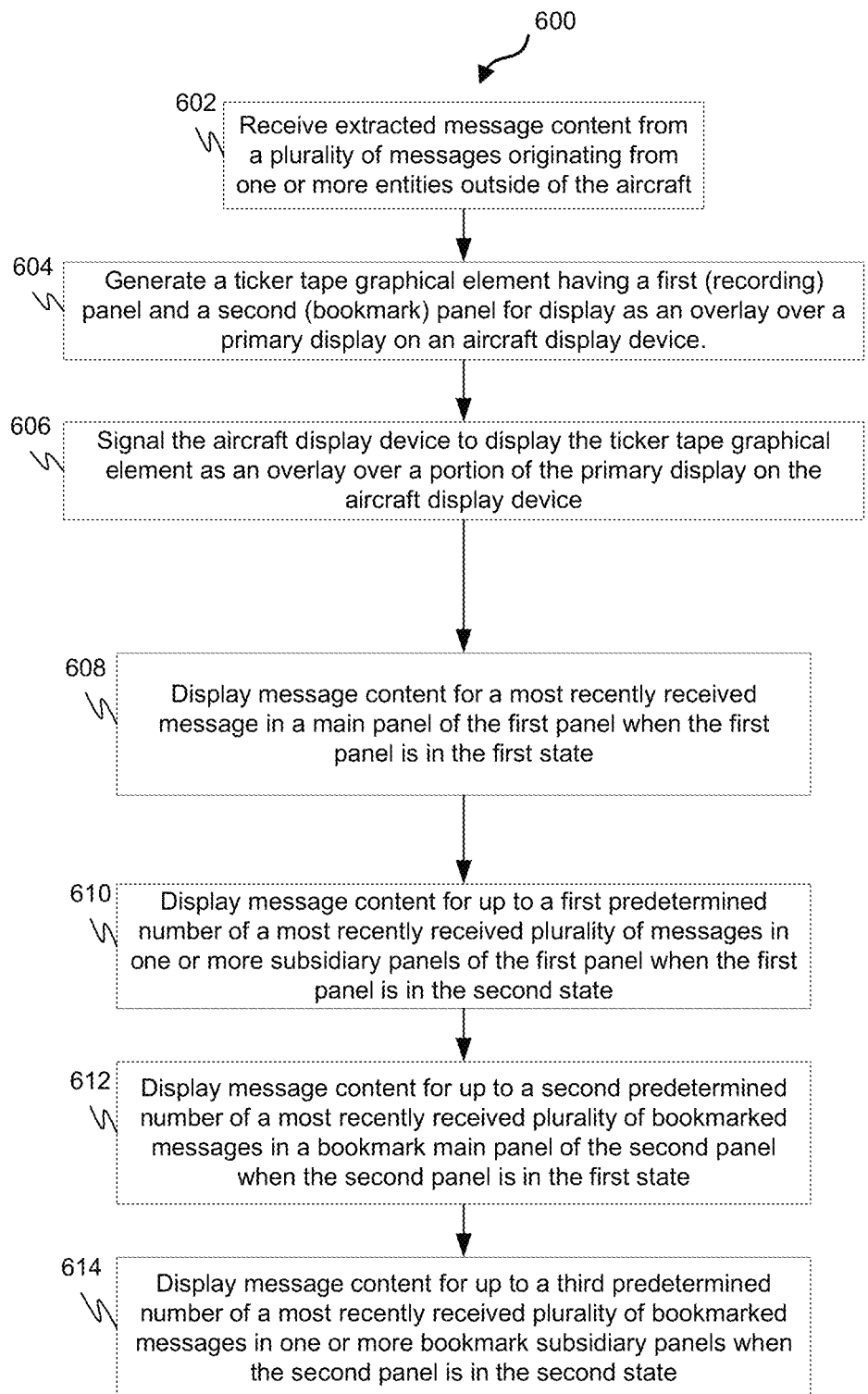
FIG. 6 is a process flow chart depicting an example process for displaying message content from an ATC conversation on an aircraft display device, in accordance with some embodiments.

FIG. 6 is a process flow chart depicting an example process 600 (e.g., implemented by a controller that implements the output module 214) for displaying message content from an ATC conversation on an aircraft display device. The order of operation within the process 600 is not limited to the sequential execution as illustrated in the figure but may be performed in one or more varying orders as applicable and in accordance with the present disclosure.

The example process 600 includes receiving extracted message content from a plurality of messages (e.g., voice and/or CPDLC) originating from one or more entities outside of the aircraft (e.g., ATC and other aircraft) (operation 602).

The example process 600 includes generating a ticker tape graphical element having a first (recording) panel and a second (bookmark) panel for display as an overlay over a primary display on the aircraft display device (operation 604). Each of the first panel and the second panel has a first (compressed) state and a second (expanded state).

The example process 600 includes signaling the aircraft display device to display the ticker tape graphical element as an overlay over a portion of the primary display on the aircraft display device (operation 606). This can allow most of the primary display to be displayed while ATC messages are on a small portion of the display.

The example process 600 includes displaying message content for a most recently received message in a main panel of the first panel when the first panel is in the first state (operation 608). The method may further include displaying a recording button, the extracted message content from the most recent received message, and a bookmark selection button in the main panel of the first panel when the first panel is in the first state.

The example process 600 includes displaying message content for up to a first predetermined number of a most recently received plurality of messages in one or more subsidiary panels of the first panel when the first panel is in the second state (operation 610). The method may further include displaying the recording button in the main panel of the first panel when the first panel is in the second state, expanding the first panel to include the one or more subsidiary panels adjacent to (e.g., below) the main panel when the first panel is in the second state, and displaying a pointer icon in the main panel that indicates that the one or more subsidiary panels are being displayed adjacent to (e.g., below) the main panel when the first panel is in the second state. Each subsidiary panel of the first panel is specific to a different message and may include a message recipient identifier (e.g., call sign), date stamp, extracted message content, bookmark selection button, and a message play button.

The example process 600 includes displaying message content for up to a second predetermined number of a most recently received plurality of bookmarked messages in a bookmark main panel of the second panel when the second panel is in the first state (operation 612). The method may further include displaying a bookmark button when the second panel is in the first state.

The example process 600 includes displaying message content for up to a third predetermined number of a most recently received plurality of bookmarked messages in one or more bookmark subsidiary panels when the second panel is in the second state (operation 614). The method may further include displaying the bookmark button in the bookmark main panel of the second panel when the second panel is in the second state, expanding (e.g., expanding upward) the second panel to include the one or more bookmark subsidiary panels adjacent to (e.g., below) the bookmark main panel when the second panel is in the second state, and displaying a pointer icon in the bookmark main panel that indicates that the one or more bookmark subsidiary panels are being displayed adjacent to (e.g., below) the bookmark main panel when the second panel is in the second state. Each bookmark subsidiary panel of the second panel is specific to a different message, includes a message recipient identifier (e.g., call sign), date stamp, extracted message content, remove bookmark selection button, and a message play button.

The example process 600 may further include displaying the first panel in the second state and the second panel in the first state after selection of the recording button while the first panel is in the first state, displaying the first panel in the first state and the second panel in the first state after selection of the recording button while the first panel is in the second state, displaying the first panel in the first state and the second panel in the second state after selection of the bookmark button while the second panel is in the first state, or displaying the first panel in the first state and the second panel in the first state after selection of the bookmark button while the second panel is in the second state.

The subject matter described herein discloses apparatus, systems, techniques, and articles for providing an abbreviated display, in the form of a ticker tape, of ATC communications that can be displayed on specific area of an aircraft display which is configured at the design time based on the flight deck display design or EFB application user interface design. The transcribed text can be displayed within this ticker text in such a way that the call sign as well as origin of the communication (e.g., outside world to aircraft vs. aircraft to outside world) can be readily discerned along with a timestamp. The transcribed text can flow continuously as new text is available to be displayed. Additionally, this ticker tape can provide the ability to pause the scrolling text as well as, by the way of gestures, allowing review of the text out of view from earlier content by pausing the scrolling text and using gestures to move it in the opposite direction of the scrolling text. Additional gestures may be used to resume the normal functionality of scrolling. The ability to transform this abbreviated display into a fuller functional display will also be provided either through gestures like swipe up/swipe down or through cursor control device operation such as a scroll wheel or knob. The ability to transform the fully functional dedicated display into abbreviated display can also be provided through gestures such as swipe up/swipe down or through cursor control device operation such as a scroll wheel or knob. Additional capability of flight phase based or flight plan progress-based transition from abbreviated display to fuller display or vice versa can also be provided so that the pilot workload is eased.

While in the abbreviated display format, additional functions such as recognizing the radio frequencies, heading, altitude, course/bearing, Squawk Code, etc., can be provided in such a way that a unique rendering of these parameters readily allow the pilot to use certain gestures or CCD operations to copy these parameters into appropriate scratchpad areas so that further operations can be performed without needing additional keying in by the pilot. For example, a recognized radio frequency can be copied either into the COM or NAV (as appropriate based on frequency) radio scratchpad so that the pilot can do a one action swap to tune to that radio. This also helps in very quick readback ability.

Additionally, the ticker display can be configured by the pilot with appropriate filter parameters that can be set such as: (i) Display only incoming or outgoing or in both directions, the communication transcription text; and (ii) Specific radio channel (VHF1 or VHF2 or HF1 or HF2)—this can be useful when pilots hear more than one Radio channels during crossover. While they listen to one channel, the other channel can be monitored via text transcription.

The disclosed apparatus, systems, techniques, and articles can provide an abbreviated display wherein primary display information is not obscured with transparency settings controlled by pilot. The disclosed apparatus, systems, techniques, and articles can provide the ability to review chronologically older transcribed text using gestures within the abbreviated display. The disclosed apparatus, systems, techniques, and articles can provide the ability to quickly transition between abbreviated and fuller displays with a single gesture. The disclosed apparatus, systems, techniques, and articles can provide the ability to recognize and additionally copy critical information such as radio frequency, heading, altitude, course/bearing, squawk code, etc., into an appropriate display scratchpad for pilot review and subsequent use. The disclosed apparatus, systems, techniques, and articles can provide the ability to recognize and mark critical data with hyperlinks to go to a corresponding function page for easier data entry. The disclosed apparatus, systems, techniques, and articles can provide the ability to configure the abbreviated display with a filter to display only the transcription text of interest.

In one embodiment, a flight deck system in an aircraft for displaying message content from an Air Traffic Controller (ATC) conversation on an aircraft display device is provided. The flight deck system comprises a controller. The controller is configured to: receive extracted message content from a plurality of messages (e.g., voice and/or CPDLC) originating from one or more entities outside of the aircraft (e.g., ATC and other aircraft); and generate a ticker tape graphical element having a first panel (recording panel) and a second panel (bookmark panel) for display as an overlay over a primary display on the aircraft display device, each of the first panel and the second panel having a first state (compressed state) and a second state (expanded state). The first panel has a main panel for displaying message content for a most recently received message and one or more subsidiary panels for displaying message content for up to a first predetermined number of the most recently received messages. The second panel has a bookmark main panel for displaying message content for up to a second predetermined number of the most recently received bookmarked messages and one or more bookmark subsidiary panels for displaying message content for up to a third predetermined number of the most recently received bookmarked messages. The controller is further configured to signal the aircraft display device to display the ticker tape graphical element as an overlay over a portion of the primary display on the aircraft display device.

These aspects and other embodiments may include one or more of the following features. The first panel, when in the first state, may display, in the main panel, a recording button, extracted message content from the most recent received message, and a bookmark selection button; and the first panel, when in the second state, may continue to display, in the main panel, the recording button, expand (e.g., expands upward) to include the one or more subsidiary panels adjacent to (e.g., below) the main panel, and display a pointer icon in the main panel that indicates that the one or more subsidiary panels are being displayed adjacent to (e.g., below) the main panel. Each subsidiary panel of the first panel may be specific to a different message and include a message recipient identifier (e.g., call sign), date stamp, extracted message content, bookmark selection button, and a message play button. Selection (e.g., touch gesture or other method) of the recording button, when the first panel is in the first state, may result in the display of the first panel in the second state and the second panel in the first state. Selection of the recording button, when the first panel is in the second state, may result in the display of the first panel in the first state and second panel in the first state. The second panel, when in the first state, may display, in the bookmark main panel, a bookmark button and ticker tape summaries of extracted message content for up to the second predetermined number of the most recently received messages that have been bookmarked; and the second panel, when in the second state, may display, in the bookmark main panel, the bookmark button, expand (e.g., expands upward) to include the one or more bookmark subsidiary panels adjacent to (e.g., below) the bookmark main panel, and display a pointer icon in the bookmark main panel that indicates that the one or more bookmark subsidiary panels are being displayed adjacent to (e.g., below) the bookmark main panel. Each bookmark subsidiary panel may be specific to a different message, and include a message recipient identifier (e.g., call sign), date stamp, extracted message content, bookmark remove button, and a message play button. Selection of the bookmark button, when the second panel is in the first state, may result in the display of the first panel in the first state and the second panel in the second state. Selection of the bookmark button, when the second panel is in the second state, may result in the display of the first panel in the first state and the second panel in the first state.

In another embodiment, a method for displaying message content from an ATC (Air Traffic Controller) conversation on an aircraft display device is disclosed. The method comprises: receiving extracted message content from a plurality of messages (e.g., voice and/or CPDLC) originating from one or more entities outside of the aircraft (e.g., ATC and other aircraft); generating a ticker tape graphical element having a first (recording) panel and a second (bookmark) panel for display as an overlay over a primary display on the aircraft display device, each of the first panel and the second panel having a first (compressed) state and a second (expanded state); signaling the aircraft display device to display the ticker tape graphical element as an overlay over a portion of the primary display on the aircraft display device; displaying message content for a most recently received message in a main panel of the first panel when the first panel is in the first state; displaying message content for up to a first predetermined number of a most recently received plurality of messages in one or more subsidiary panels of the first panel when the first panel is in the second state; displaying message content for up to a second predetermined number of a most recently received plurality of bookmarked messages in a bookmark main panel of the second panel when the second panel is in the first state; and displaying message content for up to a third predetermined number of a most recently received plurality of bookmarked messages in one or more bookmark subsidiary panels when the second panel is in the second state.

These aspects and other embodiments may include one or more of the following features. The method may further comprise: displaying a recording button, extracted message content from the most recent received message, and a bookmark selection button in the main panel of the first panel when the first panel is in the first state; displaying the recording button in the main panel of the first panel when the first panel is in the second state; expanding the first panel to include the one or more subsidiary panels adjacent to (e.g., below) the main panel when the first panel is in the second state; and displaying a pointer icon in the main panel that indicates that the one or more subsidiary panels are being displayed adjacent to (e.g., below) the main panel when the first panel is in the second state. Each subsidiary panel of the first panel may be specific to a different message and include a message recipient identifier (e.g., call sign), date stamp, extracted message content, bookmark selection button, and a message play button. The method may further comprise displaying the first panel in the second state and the second panel in the first state after selection (e.g., touch gesture or other method) of the recording button while the first panel is in the first state. The method may further comprise displaying the first panel in the first state and the second panel in the first state after selection of the recording button while the first panel is in the second state. The method may further comprise displaying a bookmark button and ticker tape summaries of extracted message content for up to the third predetermined number of the most recently received messages that have been bookmarked in the bookmark main panel of the second panel, when the second panel is in the first state; displaying the bookmark button in the bookmark main panel of the second panel when the second panel is in the second state; expanding (e.g., expands upward) the second panel to include the one or more bookmark subsidiary panels adjacent to (e.g., below) the bookmark main panel when the second panel is in the second state; and displaying a pointer icon in the bookmark main panel that indicates that the one or more bookmark subsidiary panels are being displayed adjacent to (e.g., below) the bookmark main panel, when the second panel is in the second state. Each bookmark subsidiary panel of the second panel may be specific to a different message, includes a message recipient identifier (e.g., call sign), date stamp, extracted message content, remove bookmark selection button, and a message play button. The method may further comprise displaying the first panel in the first state and the second state after selection of the bookmark button while the second panel is in the first state. The method may further comprise displaying the first panel in the first state and the second panel in the first state after selection of the bookmark button while the second panel is in the second state.

In another embodiment, a non-transitory computer readable medium is provided. The non-transitory computer readable medium is encoded with instructions that when executed by a controller for a flight deck system in an aircraft is configurable to cause the controller to perform a method. The method comprises: receiving extracted message content from a plurality of messages (e.g., voice and/or CPDLC) originating from one or more entities outside of the aircraft (e.g., ATC and other aircraft); generating a ticker tape graphical element having a first (recording) panel and a second (bookmark) panel for display as an overlay over a primary display on the aircraft display device, each of the first panel and the second panel having a first (compressed) state and a second (expanded state); signaling the aircraft display device to display the ticker tape graphical element as an overlay over a portion of the primary display on the aircraft display device; displaying message content for a most recently received message in a main panel of the first panel when the first panel is in the first state; displaying message content for up to a first predetermined number of a most recently received plurality of messages in one or more subsidiary panels of the first panel when the first panel is in the second state; displaying message content for up to a second predetermined number of a most recently received plurality of bookmarked messages in a bookmark main panel of the second panel when the second panel is in the first state; and displaying message content for up to a third predetermined number of a most recently received plurality of bookmarked messages in one or more bookmark subsidiary panels when the second panel is in the second state.

These aspects and other embodiments may include one or more of the following features. The method may further comprise: displaying a recording button, extracted message content from the most recent received message, and a bookmark selection button in the main panel of the first panel when the first panel is in the first state; displaying the recording button in the main panel of the first panel when the first panel is in the second state; expanding the first panel to include the one or more subsidiary panels adjacent to (e.g., below) the main panel when the first panel is in the second state; and displaying a pointer icon in the main panel that indicates that the one or more subsidiary panels are being displayed adjacent to (e.g., below) the main panel when the first panel is in the second state. Each subsidiary panel of the first panel may be specific to a different message and include a message recipient identifier (e.g., call sign), date stamp, extracted message content, bookmark selection button, and a message play button. The method may further comprise displaying the first panel in the second state and the second panel in the first state after selection (e.g., touch gesture or other method) of the recording button while the first panel is in the first state. The method may further comprise displaying the first panel in the first state and the second panel in the first state after selection of the recording button while the first panel is in the second state. The method may further comprise displaying a bookmark button and ticker tape summaries of extracted message content for up to the third predetermined number of the most recently received messages that have been bookmarked in the bookmark main panel of the second panel, when the second panel is in the first state; displaying the bookmark button in the bookmark main panel of the second panel when the second panel is in the second state; expanding (e.g., expands upward) the second panel to include the one or more bookmark subsidiary panels adjacent to (e.g., below) the bookmark main panel when the second panel is in the second state; and displaying a pointer icon in the bookmark main panel that indicates that the one or more bookmark subsidiary panels are being displayed adjacent to (e.g., below) the bookmark main panel, when the second panel is in the second state. Each bookmark subsidiary panel of the second panel may be specific to a different message, includes a message recipient identifier (e.g., call sign), date stamp, extracted message content, remove bookmark selection button, and a message play button. The method may further comprise displaying the first panel in the first state and the second panel in the second state after selection of the bookmark button while the second panel is in the first state. The method may further comprise displaying the first panel in the first state and the second panel in the first state after selection of the bookmark button while the second panel is in the second state.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. A software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck system in an aircraft for displaying message content from an air traffic controller (ATC) conversation on an aircraft display device, the flight deck system comprising a controller configured to:
   receive extracted message content from a plurality of messages originating from one or more entities outside of the aircraft;
   generate a ticker tape graphical element having a first panel and a second panel for display as an overlay over a primary display on the aircraft display device, each of the first panel and the second panel having a first state and a second state;
   wherein the first panel has a main panel for displaying message content for a most recently received message and one or more subsidiary panels for displaying message content for up to a first predetermined number of the most recently received messages;
   wherein the first panel, when in the first state, displays, in the main panel, a recording button, extracted message content from the most recent received message, and a bookmark selection button;

wherein the first panel, when in the second state, continues to display, in the main panel, the recording button, expands to include the one or more subsidiary panels adjacent to the main panel, and displays a pointer icon in the main panel that indicates that the one or more subsidiary panels are being displayed adjacent to the main panel;

wherein the second panel has a bookmark main panel for displaying message content for up to a second predetermined number of the most recently received bookmarked messages and one or more bookmark subsidiary panels for displaying message content for up to a third predetermined number of the most recently received bookmarked messages; and signal the aircraft display device to display the ticker tape graphical element as an overlay over a portion of the primary display on the aircraft display device.

2. The flight deck system of claim 1, wherein each subsidiary panel of the first panel is specific to a different message and includes a message recipient identifier, date stamp, extracted message content, bookmark selection button, and a message play button.

3. The flight deck system of claim 1, wherein selection of the recording button, when the first panel is in the first state, results in the display of the first panel in the second state and the second panel in the first state.

4. The flight deck system of claim 1, wherein selection of the recording button, when the first panel is in the second state, results in the display of the first panel in the first state and second panel in the first state.

5. The flight deck system of claim 1, wherein:
the second panel, when in the first state, displays, in the bookmark main panel, a bookmark button and ticker tape summaries of extracted message content for up to the second predetermined number of the most recently received messages that have been bookmarked; and
the second panel, when in the second state, displays, in the bookmark main panel, the bookmark button, expands to include the one or more bookmark subsidiary panels adjacent to the bookmark main panel, and displays a pointer icon in the bookmark main panel that indicates that the one or more bookmark subsidiary panels are being displayed adjacent to the bookmark main panel.

6. The flight deck system of claim 5, wherein each bookmark subsidiary panel is specific to a different message, and includes a message recipient identifier, date stamp, extracted message content, bookmark remove button, and a message play button.

7. The flight deck system of claim 5, wherein selection of the bookmark button, when the second panel is in the first state, results in the display of the first panel in the first state and the second panel in the second state.

8. The flight deck system of claim 5, wherein selection of the bookmark button, when the second panel is in the second state, results in the display of the first panel in the first state and second panel in the first state.

9. A method for displaying message content from an air traffic controller (ATC) conversation on an aircraft display device, the method comprising:
receiving extracted message content from a plurality of messages originating from one or more entities outside of the aircraft;
generating a ticker tape graphical element having a first panel and a second panel for display as an overlay over a primary display on the aircraft display device, each of the first panel and the second panel having a first state and a second;
signaling the aircraft display device to display the ticker tape graphical element as an overlay over a portion of the primary display on the aircraft display device;
displaying a recording button, message content for a most recently received message, and a bookmark selection button in a main panel of the first panel when the first panel is in the first state;
displaying the recording button in the main panel of the first panel, expanding the first panel to include one or more subsidiary panels adjacent to the main panel, and displaying message content for up to a first predetermined number of a most recently received plurality of messages in the one or more subsidiary panels of the first panel when the first panel is in the second state;
displaying a pointer icon in the main panel that indicates that the one or more subsidiary panels are being displayed adjacent to the main panel when the first panel is in the second state;
displaying message content for up to a first predetermined number of a most recently received plurality of messages in one or more subsidiary panels of the first panel when the first panel is in the second state;
displaying message content for up to a second predetermined number of a most recently received plurality of bookmarked messages in a bookmark main panel of the second panel when the second panel is in the first state; and
displaying message content for up to a third predetermined number of a most recently received plurality of bookmarked messages in one or more bookmark subsidiary panels when the second panel is in the second state.

10. The method of claim 9, wherein each subsidiary panel of the first panel is specific to a different message and includes a message recipient identifier, date stamp, extracted message content, bookmark selection button, and a message play button.

11. The method of claim 9, further comprising displaying the first panel in the second state and the second panel in the first state after selection of the recording button while the first panel is in the first state.

12. The method of claim 9, further comprising displaying the first panel in the first state and the second panel in the first state after selection of the recording button while the first panel is in the second state.

13. The method of claim 9, further comprising:
displaying a bookmark button and ticker tape summaries of extracted message content for up to the third predetermined number of the most recently received messages that have been bookmarked in the bookmark main panel of the second panel, when the second panel is in the first state;
displaying the bookmark button in the bookmark main panel of the second panel when the second panel is in the second state;
expanding the second panel to include the one or more bookmark subsidiary panels adjacent to the bookmark main panel when the second panel is in the second state; and
displaying a pointer icon in the bookmark main panel that indicates that the one or more bookmark subsidiary panels are being displayed adjacent to the bookmark main panel, when the second panel is in the second state.

14. The method of claim 13, wherein each bookmark subsidiary panel of the second panel is specific to a different message, includes a message recipient identifier, date stamp, extracted message content, remove bookmark selection button, and a message play button.

15. The method of claim 13, further comprising displaying the first panel in the first state and the second panel in the second state after selection of the bookmark button while the second panel is in the first state.

16. The method of claim 14, further comprising displaying the first panel in the first state and the second panel in the first state after selection of the bookmark button while the second panel is in the second state.

17. A non-transitory computer readable medium encoded with instructions that when executed by a controller for a flight deck system in an aircraft is configurable to cause the controller to perform a method, the method comprising:
   receiving extracted message content from a plurality of messages originating from one or more entities outside of the aircraft;
   generating a ticker tape graphical element having a first panel and a second panel for display as an overlay over a primary display on an aircraft display device, each of the first panel and the second panel having a first state and a second;
   signaling the aircraft display device to display the ticker tape graphical element as an overlay over a portion of the primary display on the aircraft display device;
   displaying a recording button, message content for a most recently received message, and a bookmark selection button in a main panel of the first panel when the first panel is in the first state;
   displaying the recording button in the main panel of the first panel, expanding the first panel to include one or more subsidiary panels adjacent to the main panel, and displaying message content for up to a first predetermined number of a most recently received plurality of messages in the one or more subsidiary panels of the first panel when the first panel is in the second state;
   displaying a pointer icon in the main panel that indicates that the one or more subsidiary panels are being displayed adjacent to the main panel when the first panel is in the second state;
   displaying message content for up to a second predetermined number of a most recently received plurality of bookmarked messages in a bookmark main panel of the second panel when the second panel is in the first state; and
   displaying message content for up to a third predetermined number of a most recently received plurality of bookmarked messages in one or more bookmark subsidiary panels when the second panel is in the second state.

18. The non-transitory computer readable medium of claim 17, wherein the method further comprises:
   displaying a bookmark button and ticker tape summaries of extracted message content for up to the third predetermined number of the most recently received messages that have been bookmarked in the bookmark main panel of the second panel, when the second panel is in the first state;
   displaying the bookmark button in the bookmark main panel of the second panel when the second panel is in the second state;
   expanding the second panel to include the one or more bookmark subsidiary panels adjacent to the bookmark main panel when the second panel is in the second state;
   and
   displaying a pointer icon in the bookmark main panel that indicates that the one or more bookmark subsidiary panels are being displayed adjacent to the bookmark main panel, when the second panel is in the second state.

19. The non-transitory computer readable medium of claim 18, wherein each bookmark subsidiary panel of the second panel is specific to a different message, includes a message recipient identifier, date stamp, extracted message content, remove bookmark selection button, and a message play button.

20. The non-transitory computer readable medium of claim 19, wherein the method further comprises:
   displaying the first panel in the first state and the second panel in the second state after selection of the bookmark button while the second panel is in the first state; and
   displaying the first panel in the first state and the second panel in the first state after selection of the bookmark button while the second panel is in the second state.

* * * * *